Patented July 9, 1929.

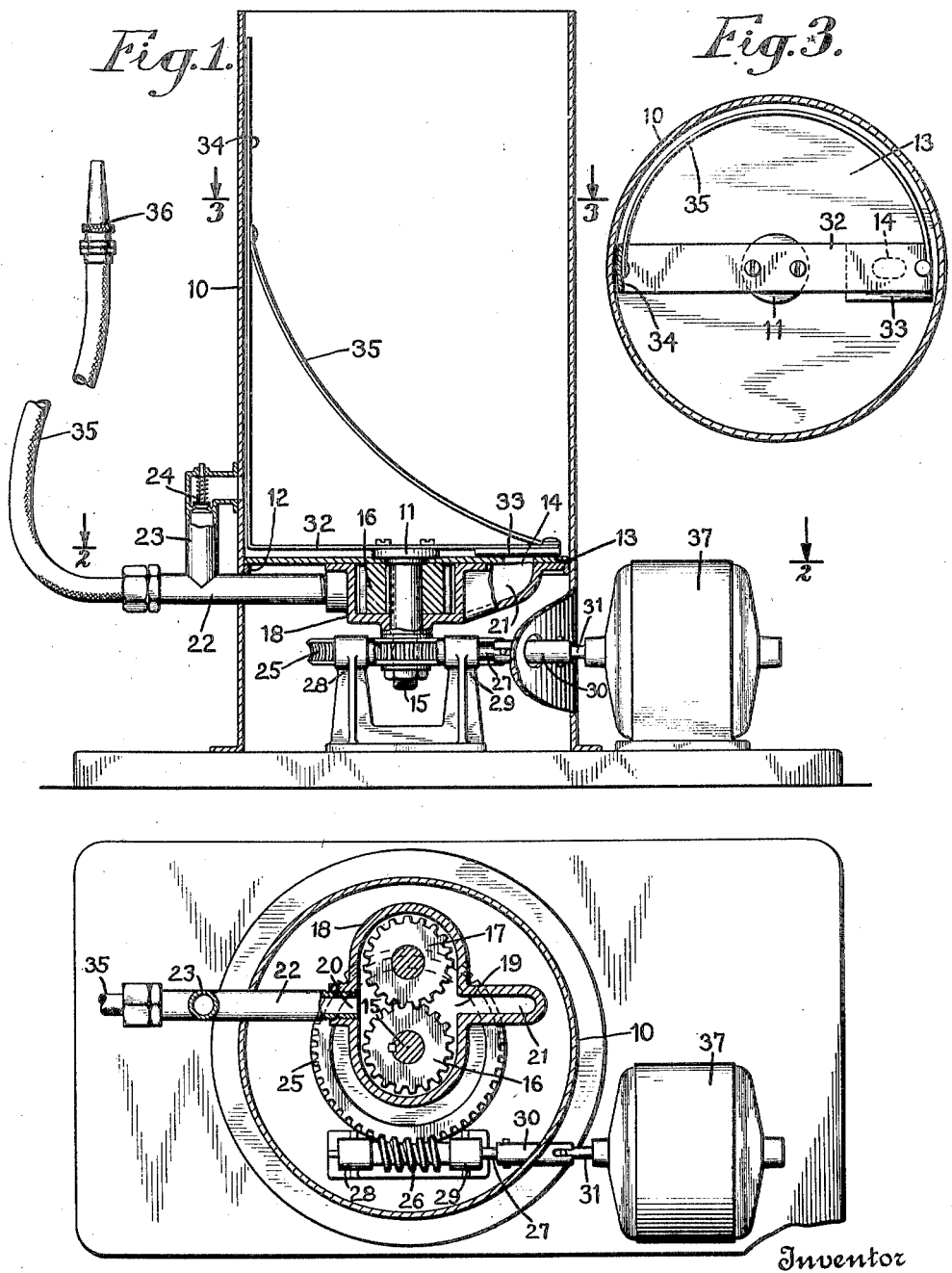

1,720,398

UNITED STATES PATENT OFFICE.

WILLIAM HARRIGAN, OF JERSEY CITY, NEW JERSEY, ASSIGNOR TO THE TEXAS COMPANY, OF NEW YORK, N. Y., A CORPORATION OF DELAWARE.

LUBRICATING APPARATUS.

Application filed January 13, 1928. Serial No. 246,430.

This invention relates generally to lubricating apparatus and in a more specific aspect to what are commonly known as grease guns for supplying lubricants to bearings under pressure.

One object of my invention is to provide an apparatus for dispensing heavy or extremely viscous lubricants which cannot now be readily handled with any light equipment of which I am aware.

Another object of my invention is to provide an apparatus for dispensing lubricants which operates without recourse to compressed air, and which is therefore entirely independent of any fluid pressure supply.

A still further object of my invention is to provide means for insuring a continuous supply of the heavy lubricant to the pumping stage as long as any lubricant remains in the storage or supply chamber.

Another object is to provide automatic means for relieving pressure on the delivery hose whenever the operator closes the valve in the discharge nozzle without shutting down the operation of the pumping mechanism.

Other objects, features and advantages of the invention will appear as the description progresses, reference being had to the accompanying drawing, in which—

Fig. 1 is a view in side elevation, largely in section, of an apparatus embodying my invention, and Fig. 2 is a sectional plan view taken on the line 2—2 of Fig. 1.

Fig. 3 is a detail view of a scraper blade.

Referring to the drawing, it will be seen that the apparatus comprises a lubricant container 10, preferably in the form of a vertically disposed cylinder which is open at its upper end. An annular ring 12 is formed or secured on the inside wall of the cylinder at a point somewhat above its lower end. The ring serves as a seat for a removable plate or partition 13 which constitutes the base of the storage section of the cylinder. The base is formed with an aperture 14 through which the grease in the cylinder is forced by reason of its own weight.

The base is also provided with a centrally disposed opening which is adapted to accommodate a bolt 15 which constitutes a shaft upon which there is mounted a spur gear 16. An idler gear 17 is mounted adjacent to gear 16 and cooperates therewith. The gears 16 and 17 are enclosed in a housing 18 so formed that its inner walls are spaced only slightly from the peripheries of the gears. The housing 18 is formed to provide opposed ports 19 and 20. Port 19 constitutes a grease inlet and communicates with cylinder 10 through a conduit or chamber 21 which is in open communication with the aperture 12 in the base 13. Port 20 constitutes a discharge outlet to which a conduit or pipe 22 of any suitable length is connected. A flexible delivery hose 25 having a valved nozzle or coupling 36 is attached to the end of the pipe 22.

The pressure in pipe 22 is controlled by means of a valved by-pass line or pipe 23 which connects the pipe 22 with the cylinder 10 at a point above the base 13. A spring controlled valve 24 is positioned in the by-pass line for regulating and maintaining the desired pressures.

Gears 16 and 17 are operated by means of a worm wheel 25 which is mounted on the lower end of shaft 15. A worm gear 26 mounted on a shaft 27 is provided for operating worm wheel 25. Shaft 27 is rotatably mounted in spaced bearing members 28 and 29. The shaft connects through a universal joint 30 with the armature shaft 31 of an electric motor 37 or other suitable driving mechanism.

So as to facilitate the movement of the heavy grease or other material in the cylinder 10 a cross bar 32 is secured to the head 11 of bolt 15. An inclined blade or scraper 33 is secured to one end of cross bar 32. The blade is forwardly and upwardly inclined in the direction of movement so as to produce a sweeping and compressing action on the material in the lower portion of the lubricant receptacle. The action of the blade tends to force the lubricant downwardly through the aperture 12 and conduit 21 to the housing 18 where it is picked up by gears 16 and 17 to be forced by them through pipe 22.

A vertically disposed scraper arm 34 is secured to the opposite end of bar 32 and extends upwardly almost to the top of cylinder 10. A resilient curved tow rod 35 is connected to one end of bar 32 and to an intermediate point of scraper arm 34 so as to give support to arm 34 and to hold it in contact with the inner wall of cylinder 10. The tow rod is curved so as to conform closely to the configuration of the cylinder wall.

In operation the cylinder 10 is filled either wholly or in part with the material to be dispensed such, for example, as heavy grease. The flexible hose 35 with its nozzle or coupling 36 is secured to the end of pipe 22 and the motor 37 is started. Shaft 15 is then rotated by means of worm wheel 25 and worm gear 26 which is carried on shaft 27 which, in turn, is operated by the electric motor 37. The rotation of shaft 15 actuates spur gear 16, which is keyed thereon, and gear 17 which meshes with gear 16. Grease from cylinder 10 gravitates or is forced by scraper 33 through the aperture 12 in the base of cylinder 10, thence through conduit 21 and port 19 into housing 18. As the grease enters the housing it is picked up by one or the other of the spur gears and is forced around between the teeth of the gears and the wall of the housing until it is impelled under pressure outwardly through pipe 22 and hose 35. The apparatus may be allowed to run continuously without danger to the flexible hose 35, even when valve 36 is closed, because as soon as the pressure built up in pipe 22 and by-pass line 23 becomes excessive, valve 24 will rise from its seat and permit the grease to be discharged into the cylinder 10.

During the operation of the apparatus scrapers 34 and 33 are rotating, the scraper 34 removing from the wall of the cylinder 10 any grease that may tend to adhere to it, while scraper 33 periodically forces grease through aperture 14 to insure a constant supply of grease to the impelling mechanism. The action of scraper 33 is supplementary to the action of gravity which normally insures a sufficient supply of grease to the impelling mechanism.

Apparatus of preferred form and construction has been illustrated and described for the purpose of showing a way in which this invention may be practiced, but the inventive thought upon which this application is based is broader than the illustrative embodiment thereof, and no limitations are intended other than those imposed by the appended claims.

What I claim is:

1. Grease dispensing apparatus comprising a chambered member for the storage of grease, the base of the chambered member being provided with an opening through which grease may gravitate, a housing formed with inlet and outlet ports disposed below said base and secured thereto, the inlet port registering with the opening in said base to permit the unobstructed passage of grease to said housing, means in said housing for discharging grease through the outlet port, rotatable means for scraping the wall of the chambered member, and a common means for operating said grease discharging means and said scraping means.

2. Grease dispensing apparatus comprising a chambered member for the storage of grease, a removable plate forming a base for the chambered member, said plate being provided with an opening through which grease may gravitate, a housing formed with inlet and outlet ports disposed below said plate and secured thereto, the inlet port registering with the opening in said plate to permit the unobstructed passage of grease to said housing, and power actuated means in said housing for discharging grease through the outlet port under pressure.

3. Grease dispensing apparatus comprising a chambered member for the storage of grease, a removable plate forming a base for the chambered member, said plate being provided with an opening through which grease may gravitate, a housing formed with inlet and outlet ports disposed below said plate and secured thereto, the inlet port registering with the opening in said plate to permit the unobstructed passage of grease to said housing, means in said housing for discharging grease through the outlet port, means for scraping the wall of the chambered member, and a common means for operating said grease discharging means and said scraping means.

4. In grease dispensing apparatus of the class described, a chambered member for the storage of grease formed with an opening in the base thereof, a housing member disposed below said base and formed with inlet and outlet ports, the inlet port registering with the opening in said base, a rotatable shaft extending through the housing member and terminating in the lower portion of the storage chamber, co-operating gears disposed in said housing, one of said gears being secured to said shaft, means mounted on the end of the shaft within the storage chamber for scraping the wall of the chamber, and means for actuating the shaft to operate the gears and the scraping means.

5. In grease dispensing apparatus of the class described, a chambered member for the storage of grease formed with an opening in the base thereof, a housing member disposed below said base and formed with inlet and outlet ports, the inlet port registering with the opening in said base, a rotatable shaft extending through the housing member and terminating in the lower portion of the storage chamber, cooperating gears disposed in said housing, one of said gears being secured to said shaft and rotatable therewith, a horizontally disposed cross bar mounted on the end of the shaft within the storage chamber, a vertically disposed scraper secured to one end of the cross bar for scraping the wall of the chambered member, an inclined scraper secured on the opposite end of the cross bar for periodically forcing grease through the opening in the base of the storage chamber, and means for actuating the shaft and the elements secured thereto.

In witness whereof I have hereunto set my hand and seal this 6th day of January, 1928.

WILLIAM HARRIGAN.